United States Patent [19]

Staats et al.

[11] 4,070,774
[45] Jan. 31, 1978

[54] IDENTIFICATION CARD POUCH

[75] Inventors: Henry N. Staats, Deerfield; Jerome J. Wiermanski, Elmhurst, both of Ill.

[73] Assignee: General Binding Corporation, Northbrook, Ill.

[21] Appl. No.: 714,407

[22] Filed: Aug. 16, 1976

[51] Int. Cl.² .................................................. G09F 3/02
[52] U.S. Cl. .................................................... 40/2.2
[58] Field of Search .................... 40/2.2, 135; 283/7; 156/290

[56] References Cited

U.S. PATENT DOCUMENTS

| | | | |
|---|---|---|---|
| 2,748,048 | 5/1956 | Russell | 156/290 X |
| 3,152,901 | 10/1964 | Johnson | 40/2.2 |
| 3,245,697 | 4/1966 | Nugent | 283/7 |
| 3,417,797 | 12/1968 | Hannon | 283/7 X |
| 3,679,512 | 7/1972 | Macone | 156/290 X |
| 3,770,570 | 11/1973 | Swearingen | 156/290 X |

Primary Examiner—Russell R. Kinsey
Assistant Examiner—Wenceslao J. Contreras
Attorney, Agent, or Firm—Hill, Gross, Simpson, Van Santen, Steadman, Chiara & Simpson

[57] ABSTRACT

An identification card pouch is disclosed for use with a paper stock card having a photograph positioned thereon. The pouch has front and back covering leaves which are placed against the front and back surfaces of the identification card. A heat reactivatible adhesive is coated on the inside surfaces of the front and back leaves to permit lamination of the covering leaves to the identification card. A bond promoting patterned layer is arranged on the heat reactivatible adhesive on the front leaf to form treated and untreated areas. The treated areas adhere to the photograph while the untreated areas adhere to the paper card stock.

21 Claims, 11 Drawing Figures

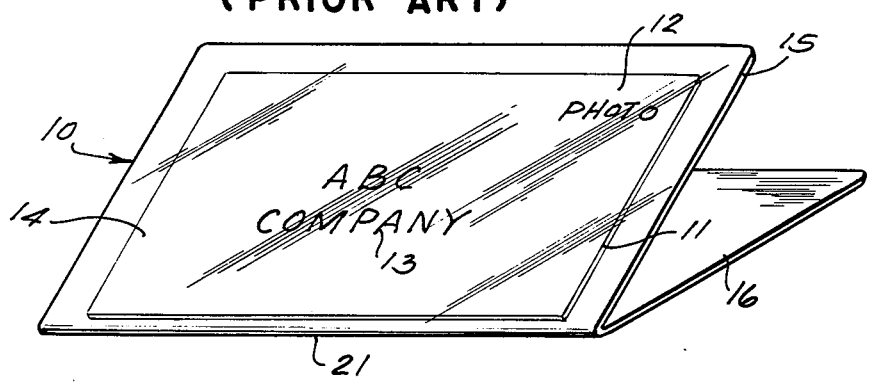
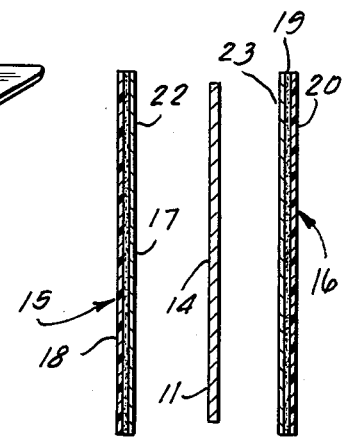
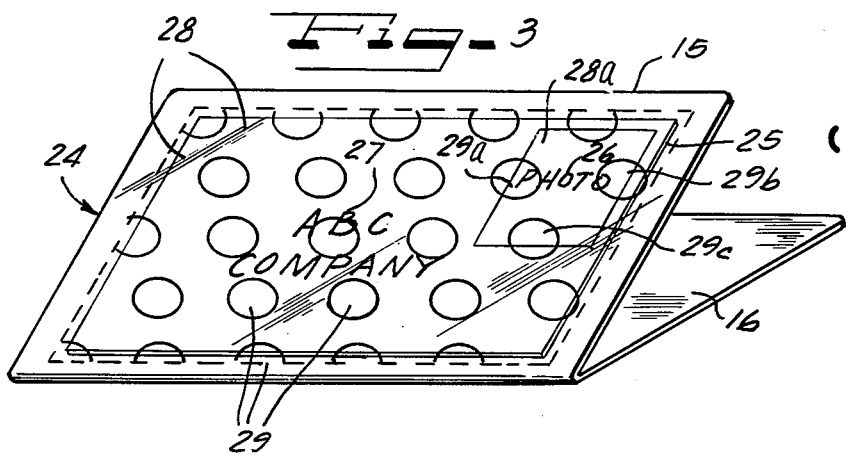
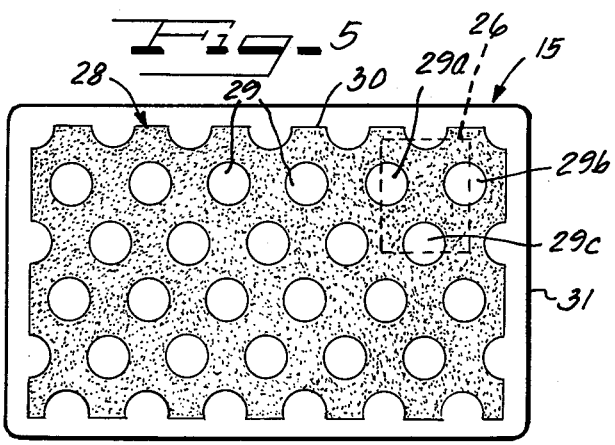
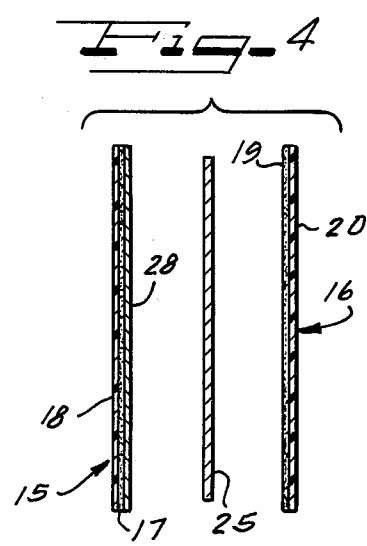

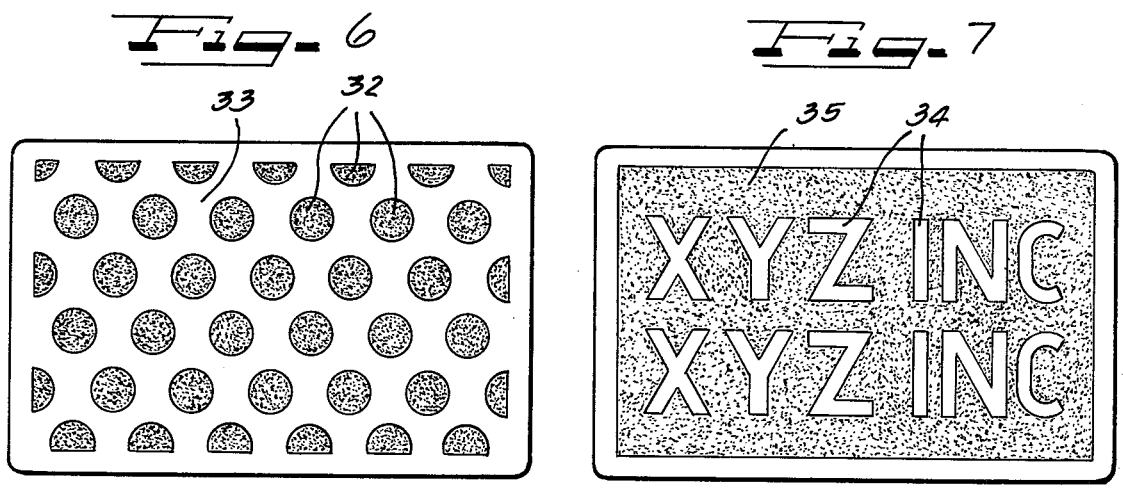
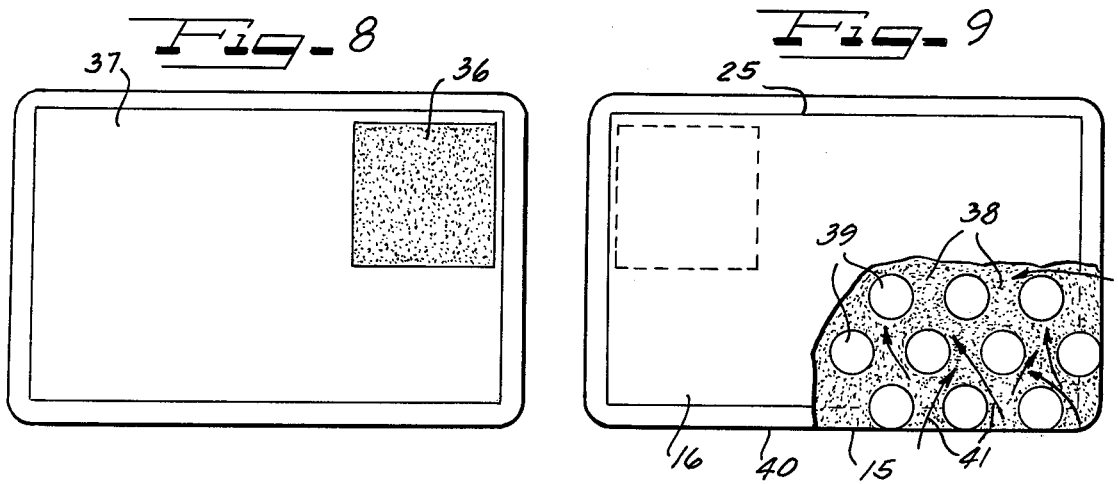
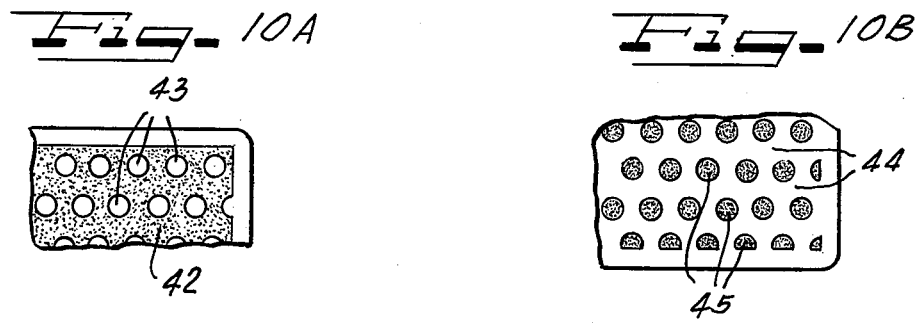

IDENTIFICATION CARD POUCH

BACKGROUND OF THE INVENTION

1. Field of the Invention

This invention relates to the laminating art in which objects are heat-sealed with leaves of plastic film which form a pouch or covering over the object such as an identification card.

2. Description of the Prior Art

The use of polyester film carriers, and particularly polyethylene terephthalate (Mylar) in combination with heat-reactivatible coatings, such as, polyethylene, ethylene-ethyl acrylate, or similar adhesives, has become quite popular as a useful laminating material. Such films are utilized as described in U.S. Pat. Nos. 3,684,638 and 3,711,355 for covering wallet-sized identification cards. Such a covering prevents tampering with photographs and date indicia on the identification card.

When employed in conjunction with identification cards produced as Polaroid (a registered trademark of Polaroid Corporation) photos, it is important that a high integrity bond be formed between the covering film and the photo even though the surface may remain wet after the development process. Consequently, special coatings have been developed to permit bonding between the heat reactivatible adhesive surface and the photo. Recently, the Polaroid Corporation has developed an improved color film under the trademark Polacolor No. 2 which obsoletes all Polacolor No. 1 film in the marketplace. It has been noted that pouch film previously treated to stick to wet Polacolor No. 1 films will not stick to wet Polacolor No. 2 film. Polaroid Corporation has developed a treatment known as Polaroid No. 1406 adhesive solution also known as Polaroid adhesive No. 2 which, when applied to the heat reactivatible surfaces of a pouch film material, permits bonding of the film to an all-photo identification card. Such an I.D. card pouch is shown at 10 in FIG. 1. An I.D. card 11 having a continuous photo surface with both a photo image 12 and indicia 13 is positioned between a front film leaf 15 and a back film leaf 16. Heat reactivatible coatings 17 and 19 shown in FIG. 2 are respectively coated on the inside surfaces of polyethylene terephthalate base films 18 and 20 forming the front and back leaves.

The leaves 15 and 16 may or may not be joined along the edge 21, as shown in FIG. 1.

In order to permit the all photo identification card 11 to adhere to the covering leaves 15 and 16, a layer of Polaroid 1406 adhesive solution is placed as a coating 22 on the inside surface of the heat reactivatible coating 17 and as a coating 23 on the inside surface of the heat reactivatible coating 19. This adhesive solution permits the leaves to firmly bond to surfaces of the all-photo I.D. card.

In many applications it is more advantageous, however, to utilize an identification card of Paper Stock on which a Polaroid photograph is positioned. If the above laminating techniques are utilized with such a hybrid identification card, problems occur since the heat reactivatible adhesive treated with the Polaroid No. 1406 does not bond well to paper card stock surfaces and bonds poorly to photos having film surfaces other than Polacolor No. 2 such as Polaroid Polacolor No. 1 film. Also with the prior art laminating techniques, the edge if the card is susceptible to deterioration as the result of atmospheric moisture and bond integrity consequently decreases with continued exposure to such conditions. Finally, the exact position of the photograph on the paper card stock may differ for various applications.

SUMMARY OF THE INVENTION

It is an object of this invention to provide a heat reactivatible film pouch for paper card stock identification cards having a photograph variably positioned on a portion thereof wherein the adhesion properties of the photograph to the heat reactivatible adhesive differs from that of the paper stock to the heat reactivatible adhesive.

It is a further object of this invention to provide a heat reactivatible film pouch which bonds to a paper stock identification card having a Polacolor No. 2 photograph arranged thereon.

It is another object of this invention to provide an I.D. card pouch which indicates an attempt to tamper with the photo or indicia portions of the card by distorting or destroying the portion of the card tampered with.

According to the invention, an identification card covering has front and back leaves constructed of polyethylene terephthalate as a covering film. A heat reactivatible adhesive is arranged on the card facing surface of each of these leaves. A bond-promoting pattern layer is then arranged on the heat reactivatible adhesive on the front leaf. The patterned layer has evenly distributed untreated apertures surrounded by treated areas. The treated areas are spaced from the outer edges of the front leaf by an untreated boundary zone to prevent moisture reactions. The bond promoting compound for the treated areas is preferably Polaroid No. 1406 adhesive solution which permits Polaroid No. 2 film portions to adhere to the heat reactivatible adhesive. Preferably, the patterned layer has no less than 4 untreated areas per square inch and the ratio of untreated areas to treated areas is greater than 1:5.

BRIEF DESCRIPTION OF THE DRAWINGS

FIG. 1 is a perspective view prior to lamination of an all photo identification card positioned within a film pouch of the prior art;

FIG. 2 is an end view of an all photo identification card with front and back film covering leaves of the prior art;

FIG. 3 is a perspective view of a paper card stock identification card with a separate photograph attached thereto together with a card covering film pouch of the invention;

FIG. 4 is an end view of the front and back covering leaves for the identification card pouch of this invention;

FIG. 5 is a rear view of the front covering leaf for the card pouch of this invention;

FIG. 6 is an alternate embodiment for the front leaf of FIG. 5;

FIG. 7 is a further embodiment for the front leaf of FIG. 5;

FIG. 8 is still another embodiment of the front leaf of FIG. 5;

FIG. 9 is a rear view of a laminated I.D. card using a front cover leaf having a bond-promoting covering which is undesirable; and FIGS. 10a and 10b are fragmentary rear views of a front leaf having an undesirable patterned layer.

DESCRIPTION OF THE PREFERRED EMBODIMENTS

As shown in FIG. 3, an identification card pouch 24 of this invention is utilized to cover the front and back surfaces of a paper card stock identification card 25 having a photograph 26 positioned thereon. Indicia such as at 27 may also be typed or printed onto the front face of the paper card stock.

As shown in FIG. 4, front and back leaves 15 and 16 are comprised of outer front and back base films 18 and 20 of polyethylene terephthalate. Heat reactivatible coatings 17 and 19 are respectively arranged on the inside card facing surfaces of the base films 18 and 20. Finally, an inside patterned layer 28 of a bond promoting treatment is arranged on the inside card facing surface of the heat reactivatible coating 17 on the front leaf 15. This coating preferably consists of Polaroid No. 1406 adhesive solution.

As shown in FIG. 5, the patterned layer 28 has a plurality of evenly distributed untreated areas 29. Preferably these untreated areas are circular and of relatively large dimension. At least four untreated areas per square inch are provided with an area ratio of untreated to treated areas greater than 1:5. Such an arrangement permits the photograph 26 to be positioned anywhere on the front face of the I.D. card 25 since large untreated areas 29 are provided throughout the front surface. These untreated areas will provide a strong bond to portions of the paper card stock so that if the identification card is tampered with, the card would be ruined. In the example of FIG. 5, the untreated areas 29a, b, c would not stick to the photograph whereas the treated area 28a would integrally bond thereto.

A boundary 30 around the periphery of the patterned layer 28 defines an untreated boundary zone between the peripheral edge 31 of the leaf 15 and the treated areas. This prevents moisture seepage and deterioration of the patterned layer 28.

In the alternate embodiment of FIG. 6, the pattern of the bond promoting layer may be reversed such that treated areas 32 are surrounded by untreated areas 33.

Another desirable alternative is shown in FIG. 7 wherein large untreated areas 34 are formed by block lettered indicia which may preferably represent a trademark and/or identification of the company producing the film pouch. In this case, the treated area 35 surrounds the indicia 34 which are untreated.

Finally, as shown in FIG. 8, a treated area 36 corresponding to the position and dimensions of the photograph to be positioned on the identification card may be provided within a continuous field of untreated area 37. Such an embodiment is convenient when the location of the photograph on the paper card stock identification card is predetermined.

The importance of the boundary 30 around the patterned layer 28 as shown in FIG. 5 is demonstrated in FIG. 9 wherein arrows 41 indicate possible moisture penetration paths when a treated area 38 undesirably extends to the edge 40 of an identification card 25. In this figure, a portion of the identification card 25 is shown cut away so the the arrows 41 indicating moisture penetration are shown adjacent the untreated areas 39.

An undesirable pattern for the bond promoting patterned layer 42 is shown in FIG. 10a in which small untreated areas 43 are provided. Such a pattern is undesirable since the desired adhesion between small untreated areas 43 and the paper card stock will not occur. If portions of the card are tampered with adequate destruction will not occur. Therefore, it is preferably that at least approximately four untreated areas per square inch be provided combined with an area ratio of untreated to treated areas greater than approximately 1:5. FIG. 10b shows anequally undesirable pattern in which small treated areas 45 are surrounded by untreated areas 44.

Although various minor modifications may be suggested by those versed in the art, it should be understood that we wish to embody within the scope of the patent warranted hereon all such embodiments as reasonably and properly come within the scope of our contribution to the art.

We claim as our invention:

1. A card covering for use with a paper stock card having a photographic image placed over a portion thereof, comprising:
   a. polyethylene terephthalate front and back covering leaves each having an inside surface for contacting front and back surfaces of the card;
   b. a heat reactivatible adhesive on said inside surface of said front and back leaves for adhesion to said paper stock or to itself but which does not substantially adhere to the photographic image; and
   c. a bond promoting patterned layer for adhesion to the photographic image on said heat reactivatible adhesive distributed over a major portion of the surface of said front leaf to form treated and untreated areas on said adhesive;

wherein the treated areas of the front covering leaf adhere to the photographic image and the untreated areas to the paper stock card.

2. The covering of claim 1 in which outer edges of the bond promoting patterned layer are spaced from out edges of said front leaf by an untreated boundary zone.

3. The covering of claim 1 in which the bond promoting patterned layer comprises an evenly distributed pattern of untreated areas surrounded by treated areas.

4. The covering of claim 3 in which no less than approximately four untreated areas per square inch are provided and the ratio of untreated areas to treated areas is greater than approximately 1:5.

5. The covering of claim 1 in which the bond promoting patterned layer comprises an evenly distributed pattern of treated areas surrounded by untreated areas.

6. The covering of claim 1 in which the bond promoting patterned layer has a plurality of evenly distributed circular apertures therein.

7. The covering of claim 1 in which the bond promoting patterned layer has an indicia pattern.

8. The covering of claim 1 in which the bond promoting patterned layer comprises a treated area having dimensions and a position corresponding to the dimensions and position of the photographic image on the paper card stock.

9. The covering of claim 1 in which the heat reactivatible adhesive comprises a polyethylene adhesive.

10. A card covering for use with a paper stock card having a photographic image placed over a portion thereof, comprising:
   a. polyethylene terephthalate front and back covering leaves each having an inside surface for contacting front and back surfaces of the card;
   b. a heat reactivatible polyethylene adhesive on said inside surface of said front and back leaves for adhering to the paper stock card but substantially not to the photographic image; and c. a bond promoting patterned layer on said heat reactivatible, adhesive on said front leaf, said patterned layer comprising evenly distributed untreated apertures surrounded by treated areas, said treated areas being spaced from outer edges of said front leaf by an untreated boundary zone, said patterned layer treated areas adhering to the photographic image, and the patterned layer having no less than approximately four untreated areas per square inch and the ratio of untreated areas to treated areas being greater than approximately 1:5.

11. An identification card comprising:
   a. a paper stock card having a photographic image variably positioned on a front surface thereof;
   b. polyethylene terephthalate front and back covering leaves;
   c. a heat reactivatible adhesive on one surface of each of said front and back leaves and in binding contact with said paper stock card but which does not substantially bind to the photographic image; and
   d. a bond promoting patterned layer on said heat reactivatible adhesive to form treated and untreated areas on said adhesive, said treated areas adjacent said photographic image adhering thereto.

12. The card of claim 11 in which the outer edges of the bond promoting patterned layer are spaced from the outer edges of said front leaf by an untreated boundary zone.

13. The card of claim 11 in which the bond promoting patterned layer comprises an evenly distributed pattern of untreated areas surrounded by treated areas.

14. The card of claim 13 in which no less than approximately four untreated areas per square inch are provided and the ratio of untreated areas to treated areas is greater than approximately 1:5.

15. The card of claim 11 in which the bond promoting patterned layer comprises an evenly distributed pattern of treated areas surrounded by untreated areas.

16. The card of claim 11 in which the bond promoting patterned layer has a plurality of evenly distributed circular apertures therein.

17. The card of claim 11 in which the bond promoting patterned layer has a indicia pattern.

18. The card of claim 11 in which the bond promoting patterned layer comprises a treated area having dimensions and a position corresponding to the dimensions and position of the photographic image on the paper card stock.

19. The card of claim 11 in which the heat reactivatible adhesive comprises a polyethylene adhesive.

20. The card of claim 11 in which the reactivatible adhesive comprises ethylene-ethyl acrylate copolymer.

21. An identification card comprising:
   a. a paper stock card having a photographic image attached on a front surface thereof;
   b. polyethylene terephthalate front and back covering leaves for contacting front and back surfaces of the card;
   c. a heat reactivatible polyethylene adhesive on said inside surface of said front and back leaves which adheres to the paper stock card but which does not substantially adhere to the photographic image; and
   d. a bond promoting patterned layer on said heat reactivatible adhesive on said front leaf, said patterned layer comprising evenly distributed untreated apertures surrounded by treated areas, said treated areas being spaced from outer eedges of said front leaf by an untreated boundary zone, said patterned layer treated areas adhering to the photographic image, and the patterned layer having no less than approximately four untreated areas per square inch and the ratio of untreated areas to treated areas being greater than approximately 1:5.

* * * * *